(12) United States Patent
Palberg et al.

(10) Patent No.: US 11,679,961 B2
(45) Date of Patent: Jun. 20, 2023

(54) METHOD AND APPARATUS FOR CONTROLLING A CRANE, AN EXCAVATOR, A CRAWLER-TYPE VEHICLE OR A SIMILAR CONSTRUCTION MACHINE

(71) Applicant: Liebherr-Components Biberach GmbH, Biberach an der Riss (DE)

(72) Inventors: Michael Palberg, Riedlingen (DE); Jürgen Resch, Degernau (DE); Oliver Fenker, Warthausen (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 90 days.

(21) Appl. No.: 16/129,343

(22) Filed: Sep. 12, 2018

(65) Prior Publication Data

US 2019/0016569 A1    Jan. 17, 2019

Related U.S. Application Data

(63) Continuation of application No. PCT/EP2017/000451, filed on Apr. 7, 2017.

(30) Foreign Application Priority Data

Apr. 8, 2016  (DE) ...................... 10 2016 004 250.8

(51) Int. Cl.
*B66C 13/46* (2006.01)
*E02F 9/26* (2006.01)
(Continued)

(52) U.S. Cl.
CPC ............ *B66C 13/46* (2013.01); *B64C 39/024* (2013.01); *B66C 13/16* (2013.01); *E02F 9/264* (2013.01);
(Continued)

(58) Field of Classification Search
CPC ...... B66C 13/46; B66C 13/16; G05D 1/0094; E02F 9/264; B64C 39/024; B64C 2201/145; B64C 2201/127
(Continued)

(56) References Cited

U.S. PATENT DOCUMENTS 9,643,722 B1* 5/2017 Myslinski .............. B64D 47/02
2012/0140202 A1* 6/2012 Rothenberger ......... G01S 17/04
356/4.01
(Continued)

FOREIGN PATENT DOCUMENTS

DE         19807989 A1    9/1999
DE       102004041938    3/2006
(Continued)

*Primary Examiner* — Maceeh Anwari
(74) *Attorney, Agent, or Firm* — Levine Bagade Han LLP

(57) ABSTRACT

The present invention generally relates to the control of material transfer machines and/or construction machines having camera assistance. The invention here in particular relates to a method and to an apparatus for controlling a material transfer machine and/or a construction machine, in particular in the form of a crane, of an excavator, or of a crawler-type vehicle, wherein an image of the piece of working equipment is provided to a machine operator and/or to a machine control by an imaging sensor. The invention furthermore also relates to the material transfer machine and/or construction machine itself, in particular to a crane, having a display apparatus for displaying an image of the piece of working equipment and/or of the environment of the piece of working equipment. It is proposed to use a remote-controlled aerial drone which is equipped with at least one imaging sensor and by means of which the desired image of the piece of working equipment and/or of the equipment environment can be provided from different directions of view.

20 Claims, 1 Drawing Sheet

(51) Int. Cl.
*G05D 1/00* (2006.01)
*B64C 39/02* (2023.01)
*B66C 13/16* (2006.01)
*B64U 101/30* (2023.01)

(52) U.S. Cl.
CPC ....... *G05D 1/0094* (2013.01); *B64U 2101/30* (2023.01); *B64U 2201/104* (2023.01)

(58) Field of Classification Search
USPC .......................................................... 701/3
See application file for complete search history.

(56) References Cited

U.S. PATENT DOCUMENTS

| | | |
|---|---|---|
| 2016/0018551 A1 | 1/2016 | Cole et al. |
| 2016/0050840 A1 | 2/2016 | Sauder et al. |
| 2017/0175363 A1* | 6/2017 | Clarke .................. E02F 9/264 |
| 2018/0044893 A1* | 2/2018 | Machida ................ H04N 7/181 |

FOREIGN PATENT DOCUMENTS

| | | |
|---|---|---|
| DE | 102009028990 | 10/2010 |
| DE | 202012012116 U1 | 4/2014 |
| DE | 102013019098 | 1/2015 |
| DE | 102014009165 | 12/2015 |
| DE | 102014218749 | 3/2016 |
| DE | 102014218749 A1 * | 3/2016 |
| EP | 2993620 | 3/2016 |
| EP | 2993620 A1 * | 3/2016 |
| WO | WO 2015/179797 | 11/2015 |
| WO | WO 2017/174203 | 10/2017 |

* cited by examiner

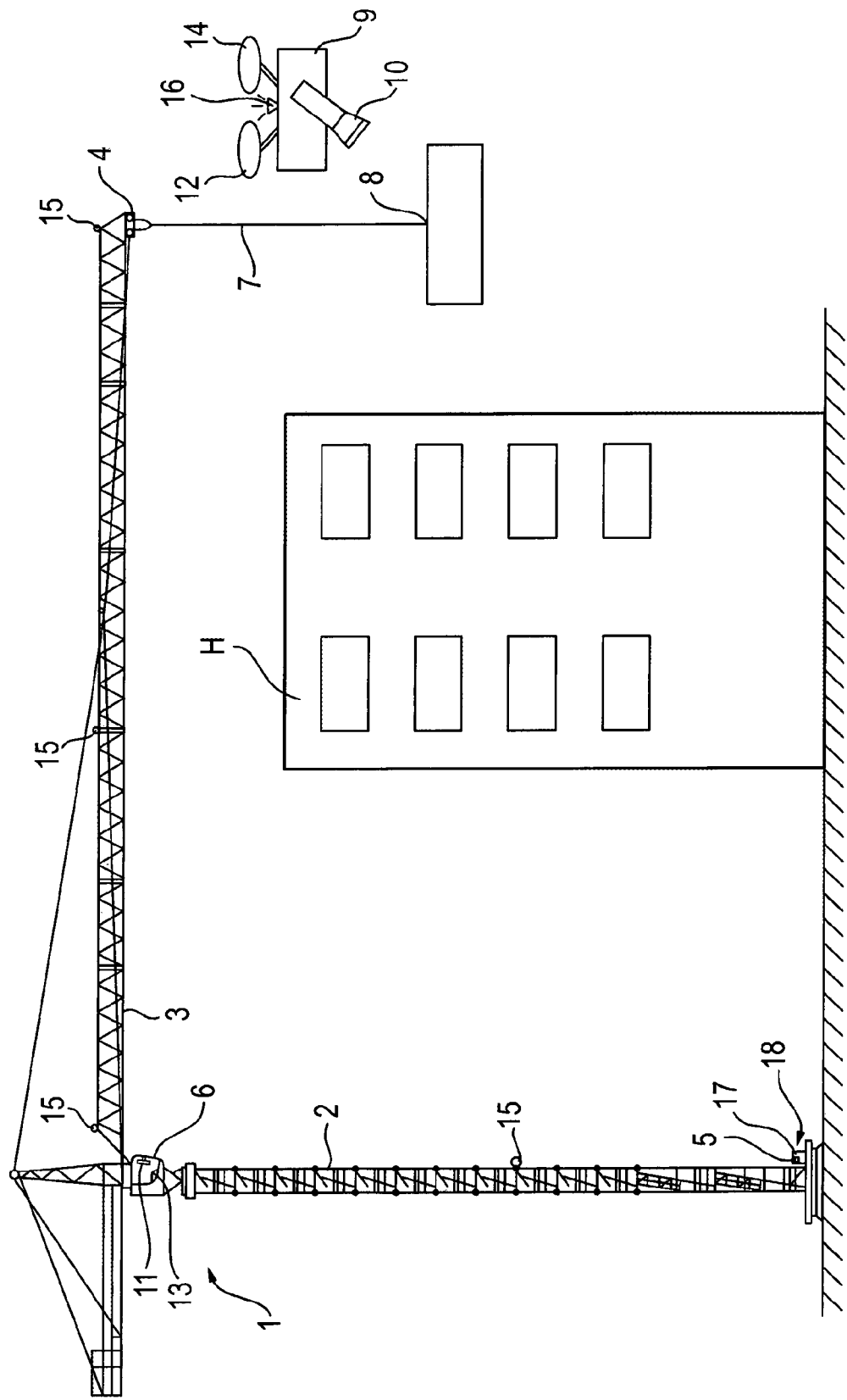

METHOD AND APPARATUS FOR CONTROLLING A CRANE, AN EXCAVATOR, A CRAWLER-TYPE VEHICLE OR A SIMILAR CONSTRUCTION MACHINE

CROSS-REFERENCE TO RELATED APPLICATIONS

This application is a continuation of International Application No. PCT/EP2017/000451, filed Apr. 7, 2017, which claims priority to German Patent Application No. 10 2016 004 250.8, filed Apr. 8, 2016, both of which are incorporated by reference herein in their entireties.

BACKGROUND

The present invention generally relates to the control of material transfer machines and/or construction machines having camera assistance. The invention here in particular relates to a method and to an apparatus for controlling a material transfer machine and/or a construction machine, in particular in the form of a crane, of an excavator, or of a crawler-type vehicle, wherein an image of the piece of working equipment is provided to a machine operator and/or to a machine control by an imaging sensor. The invention furthermore also relates to the material transfer machine and/or construction machine itself, in particular to a crane, having a display apparatus for displaying an image of the piece of working equipment and/or of the environment of the piece of working equipment.

In cranes such as revolving tower cranes, telescopic cranes, and harbor cranes or construction machinery such as excavators or floor-borne vehicles such as surface miners, it is often the case in operation that the piece of working equipment to be controlled by the machine operator is not in the field of vision of the machine operator. If, for example, a load is picked up or placed down by a lifting hook of a crane behind a building edge or a visible edge, the load picking location or placement location is not visible to the crane operator at times so that the crane operator has to work blind, so-to-say, and has to rely on the instructions of a signaler. In a similar manner, it can also occur with other construction devices or material transfer devices such as an excavator that the machine operator can no longer see the piece of working equipment, for example when work is carried out with an excavator bucket or with a grabber in a deeper trench or behind a slope.

To improve the control of the piece of working equipment in visibly restricted regions, it has already been proposed to provide the machine operator or the machine control with a camera image of the piece of working equipment, with said image advantageously being able to be a real time image or a live image in the sense of a video image in order, for example, to visualize oscillating movements of the lifting hook of a crane or an obstacle disposed in the vicinity of the piece of working equipment.

It has already been proposed with revolving tower cranes, for example, to install a camera at the trolley that looks downward toward the lifting hook in the direction of the downward running hoist rope, with the lifting hook position being automatically determined with the aid of image evaluation, cf. DE 20 2012 012 116 U1. The height of the lifting hook with this already known camera arrangement, however, has to be determined by calculation and the camera image is not much help on the controlling of the lifting hook height, for example on the placing down of a load on the ground or on the threading into an eye, since the camera looks down in a perpendicular manner.

It is further known from document DE 198 07 989 A1 to attach a video camera to the hook-type bottom block of the crane that transmits a camera image of the load attached to the lifting hook to a monitor located in the crane operator's cab. However, the downward looking camera is also subject to the aforesaid restrictions.

It is therefore the underlying object of the invention to provide an improved method and an improved apparatus for controlling a material transfer machine and/or a construction machine and to provide an actual improved material transfer machine and/or construction machine that avoid the disadvantages of the prior art and further develop the latter in an advantageous manner. An improved visualization of the piece of working equipment relative to its environment should in particular also be provided in difficult, vision-impaired regions.

SUMMARY

Said object is achieved in accordance with the invention by a method in accordance with claim 1, by a material transfer machine and/or construction machine in accordance with claim 6, and by a control apparatus in accordance with claim 16. Preferred embodiments of the invention are the subject of the dependent claims.

It is therefore proposed to use a remote-controlled aerial drone which is equipped with at least one imaging sensor and by means of which the desired image of the piece of working equipment and/or of the equipment environment can be provided from different directions of view. A perspective, three-dimensional image of the piece of working equipment and of its environment can in particular be provided from oblique viewing axes by means of such an aerial drone, with said oblique viewing axes being able to be acquired from a point spaced apart from the machine and its driver's cab and from above the ground so that the piece of working equipment and its environment can be made visible to the machine operator from a direction of view such as an external observer would also see. With a crane, images of the lifting hook and of its environment can be provided that look at the vertical center crane plane through the boom obliquely from the side or in a perpendicular manner. Images of the lifting hook can also be provided from drone positions that are disposed in this vertical center crane plane passing through the boom. The relative positions between the piece of working equipment and its environment or a destination point can be visualized very much better by such perspective images from different viewing axes.

Different types of imaging sensors can be used at the aerial drone here. An advantageous embodiment can, for example, comprise a camera, in particular in the form of a video camera or television camera, being installed at the aerial drone by means of which a very realistic image of the lifting hook environment can be provided which gives the machine operator the feeling of looking through his own eyes.

Provision can, however, alternatively or additionally be made that an infrared sensor and/or a radar sensor and/or a photonic mixing device and/or a time of flight sensor in the form of a time of flight detector is/are used as the imaging sensor. With such a time of flight sensor or PMD sensor, the measurement objects are illuminated by light pulses and the time of flight of the signal is measured. The distance between the camera and the object can be calculated on the basis of the time of flight. The resulting distance image can subsequently be presented in different manners (e.g. colors as distances). In addition to the distance, a gray scale image can be calculated from the intensity of the reflected light.

A plurality of imaging sensors of different image categories can advantageously also be provided at the aerial drone, in particular a camera in conjunction with an infrared sensor, for detecting different images. The different images can be presented in different display units or in different sections of the same display unit. The images of at least two different sensors from one image processing module can advantageously also be superposed and displayed as a common image, for example such that the hotter parts of an infrared image that may, for example, represent persons are overlaid in a "normal" camera image.

In an advantageous further development of the invention, the camera or the imaging sensor system can also be configured to provide a three-dimensional image of the piece of working equipment or of its environment. A TOF, i.e. a time of flight, sensor system as previously explained can be used for this purpose. A plastic representation can be generated by 3D imaging technology that also gives the machine operator a feeling for the depth of the displayed space.

To enable a simple operation of the aerial drone, the aerial drone can be controlled in a further development of the invention in dependence on a machine position and/or on a position of a piece of working equipment such that the aerial drone also automatically follows machine movements, in particular movements of a piece of working equipment and at least approximately maintains or attempts to maintain and tracks a desired position relative to the machine and/or to its piece of working equipment on machine movements, in particular on movements of a piece of working equipment. If the aerial drone is used in conjunction with a crane, for example, the aerial drone can automatically follow the lifting hook of the crane with an activated automatic follow mode. If, for example, a relative position of the aerial drone at approximately the lifting hook height or a little above it is desired and set by the boom with a lateral spacing from the vertical center crane level, the aerial drone can automatically lower or elevate its operating altitude when the lifting hook is lowered or raised and/or can fly forward or backward in parallel with the vertical center crane plane when the trolley of the crane is traveled and/or can fly laterally transversely to the left or right when the crane is rotated.

The aerial drone can, however, advantageously also be autonomously remote controlled such that different desired positions relative to the machine and/or to its piece of working equipment can be freely flown to by the aerial drone. This can, for example, take place by inputting a desired position for the aerial drone relative to the lifting hook or to the piece of working equipment, for example such that in a position control module that can be provided in the crane operator's cab or in a driver's station or in a remote control station a position is input with respect to the lifting hook, for example in the form of "2 m above laterally to the right of the lifting hook". Alternatively or additionally, however, the aerial drone can also be flown completely freely with respect to the machine and its piece of working equipment, for example with the aid of a joystick, to fly the aerial drone for so long until the camera position and its angle of view on the piece of working equipment and its environment satisfies the crane operator or machine operator. Alternatively or additionally, a gesture control for the aerial drone can also be provided in which a detection device such as a camera having a downstream image evaluation device detects gestures of the machine operator such as hand movements and converts them into control commands for the aerial drone.

To position the aerial drone relative to the machine or to its piece of working equipment and, for example, to be able to automatically track movements of a piece of working equipment, the aerial drone can be position-controlled in a relative coordinate system fixed with respect to the machine or crane. A position determination device can be provided for this purpose that continuously or cyclically determines the flight position of the aerial drone relative to the machine, with such a position determination device being able to have a signal localization device, for example, that can localize the signals coming from the aerial drone and/or transmitted to the aerial drone and/or can evaluated them with respect to specific signal properties to determine from them the relative position of the aerial drone with respect to the work machine.

Such a signal localization device can be implemented, for example, such that a plurality of transceivers are attached to the crane or to the machine and communicate with a transceiver at the aerial drone so that the position of the aerial drone relative to the crane or the machine can be determined from the signal times of flight and/or signal strengths and/or signal directions in the sense of the connection lines between the different transceivers at the crane side or at the machine side and the transceiver at the aerial drone. Said transceivers can, for example, be transponders or near field transceivers. In the case of a crane, said transceivers can, for example, be attached to the boom, to the trolley, to the tower and/or to the lifting hook itself. The signal times of flight from the respective transceiver at the crane or at the machine to the aerial drone and/or back from the aerial drone to the transceiver at the machine side can in particular be determined and/or signal strengths can be detected and/or the directions in which maximum signal strengths occur can be determined to determine the position of the aerial drone relative to the machine from the signal times of flight and/or from the signal strengths and/or from the signal directions of maximum signal strength.

Alternatively or additionally to such a relative position determination in a fixed machine coordinate system, the positions of the aerial drone, on the one hand, and of the machine and/or of its piece of working equipment, on the other hand, can also each be determined in an absolute coordinate system so that the relative positions can in turn be determined from the two absolute positions and the aerial drone can, for example, be controlled in the previously described manner such that the aerial drone automatically follows or attempts to follow a lifting hook or a piece of working equipment and its movements.

Said absolute position determination can take place, for example, by means of a localization system, for example a GPS system. The aerial drone, on the one hand, and the lifting hook, on the other hand, can be equipped with a GPS unit, for example, to determine the absolute spatial position of the lifting hook, on the one hand, and the absolute spatial position of the aerial drone, on the other hand. The spatial position of the lifting hook can, however, also be approximately determined from the known movement data and/or position data of the work machine component such as from the slew angle of a revolving tower crane, the trolley position, and the lifting hook height from which, with a known installation location, the lifting hook position can be determined at least approximately, in particular while neglecting oscillating movements and/or wind effects.

Alternatively or additionally to a readjustment of the flight position of the drone, the viewing axis and/or the focal length of the camera or of the imaging sensor system of the aerial drone can also be readjusted relative to the body of the aerial drone in a further development of the invention, in particular such that the camera or the sensor system is pivoted at the aerial drone and/or its focal length is adjusted to automatically follow a movement of a lifting hook or of a piece of work equipment. If, for example, the lifting hook of a crane is lowered a little, the imaging sensor system at the aerial drone can, for example, pivot downwardly a little to follow the lifting hook movement or to keep the crane hook in the image. The aerial drone can here maintain its altitude or can optionally additionally likewise move a little lower. The camera panning angle and/or the camera's focal length can here in particular be calculated in dependence on the relative position between the piece of working equipment and the aerial drone. Alternatively or additionally, these settings can also be controlled with the aid of an image processing procedure with the help of which the position of the piece of working equipment, in particular of the lifting hook, in the image can be determined and movements out of the image center can be monitored such that the viewing axis and/or the focal length of the imaging sensor system can be readjusted to maintain the representation of the piece of working equipment or of the lifting hook at the image center with an approximately unchanged representation size. Changes of the angle of view and/or of the focal length can be superposed with changes of the flight position of the aerial drone.

An orientation of the viewing axis of the imaging sensor system relative to the aerial drone changeable in this manner and/or focal length changes can in particular be advantageous if the aerial drone cannot change its position as desired, for example due to building parts or environmental obstacles such as trees that are present.

In an advantageous further development of the invention, the position control of the aerial drone can also be controlled in dependence on working zone limitations and/or model construction site data and/or obstacle detection data that can be acquired at the aerial drone itself. If the aerial drone is, for example, operated in the previously described automatic follow mode in which the aerial drone automatically follows the lifting hook of a crane, it could, for example, occur that on a rotation of the crane about its upright tower axis, the aerial drone flies along laterally transversely to maintain the position relative to the lifting hook and in so doing comes into a collision with a building part even though the lifting hook itself has not yet reached the building part. To prevent this, the position control apparatus of the aerial drone can take account of the working zone limitations and/or model construction site data and/or can itself have an obstacle recognition, for example by means of a radar sensor or of an ultrasound sensor, to be able to recognize obstacles. The automatic follow control can then be overridden and the automatic follow mode can be taken out of operation if a working zone limitation and/or a building part from the model construction site data set or an obstacle is reached. The aerial drone can then advantageously also automatically calculate an alternative route that takes account of the working zone limitation and/or evades an obstacle, with the evasion route advantageously being determined such that the lifting hook or the piece of working equipment remains in the field of vision of the imaging sensor system of the aerial drone.

The aerial drone can advantageously be connected in a technical control manner to different work machines, for example to different cranes or also to different work machines of a construction site such as selectively an excavator or a crane depending on which work machine actually requires the aerial drone. The aerial drone can here advantageously have a control interface that permits a control from different machines. A preconfiguration for example while reading a preconfiguration data set from a configuration library, can in particular take place in the flight control module and/or camera control module of the aerial drone in dependence on the control signal of the respective work machine. The aerial drone can, for example, be preconfigured for control by a crane such that the imaging sensor system focuses on a lifting hook with its focal length, whereas with a preconfiguration for an excavator, for example, the aerial drone is preconfigured for different altitudes than for a crane and for different focal lengths.

With an aerial drone that can be used in such a manner for different construction machinery or work machines, the aerial drone can, for example, be parked at the construction site and can be requested by the respectively required construction machine.

BRIEF DESCRIPTION OF THE DRAWING

The invention will be explained in more detail in the following with reference to a preferred embodiment and to accompanying drawings. There are shown in the drawings:

FIG. 1: a schematic side view of a material transfer machine in the form of a crane at whose lifting hook a load is maneuvered behind a building and thus outside the visibility zone of the crane operator's cab, with an aerial drone having a camera providing the crane operator with a camera image of the lifting hook and its environment.

DETAILED DESCRIPTION

As FIG. 1 shows, the crane 1 can be configured as a revolving tower crane whose tower 2 bears a boom 3 at which a trolley 4 is travelably supported. The boom 3 can be rotated about an upright axis together with the tower 2 or also without the tower 2—depending on the configuration of the crane as a top slewer or as a bottom slewer—for which purpose a slewing gear drive is provided. The boom 3 could optionally also be configured as being able to be luffed up and down about a horizontal transverse axis, with a suitable luffing drive being able to be provided, for example, in interaction with the boom guying. Said trolley 4 can be traveled by means of a trolley travel winch or of a different trolley travel drive.

Said drive apparatus can be controlled by a control apparatus 5 that can comprise a stationary operating unit having suitable input means, for example in the form of a joystick, in the crane operator's cabin 6 or at the control station of the crane or at a remote control station and/or can also comprise a mobile operating unit having corresponding input means. Such a mobile operating unit can, for example, be configured in the form of a radio remote control that the crane operator can carry on his person when he moves over the construction site in the crane working range to be able to also control the crane outside the crane operator's cab 6. The previously named remote control station can, however, also be a remote control station configured remotely from the construction site, for example in the sense of a simulator.

To be able to see the lifting hook 8 that can be connected to a hoist rope 7 running down from the trolley 4 or a load received thereat or the environment of the lifting hook 8 when the lifting hook 8 is outside the range of vision of the crane operator's cab 6 or of the crane operator, for example when—as FIG. 1 shows—the load is to be placed down behind a building, an aerial drone 9 is provided in accordance with the invention at which at least one camera 10 is installed by means of which a camera image of the lifting hook 8 and/or of the lifting hook environment can be provided. Said camera image is advantageously a live image or a real time image in the sense of a TV image or video image and is wirelessly transmitted from the camera 10 of the aerial drone 9 to a display unit 11 and/or to the control apparatus 5 of the crane 1, with said display unit 11, for example, being able to be a machine operator display in the manner of a tablet or of a screen or of a monitor that can be installed in the crane operator's cab 6. If a remote control station or a mobile operating unit is used to control the crane 1 in the previously named manner, said display unit 11 can be provided in the remote control station or at the mobile operating unit.

The aerial drone 9 is provided with a remote control device 12 that permits the aerial drone 9 to be remote controlled, in particular the flight control units such as rotor blades to be controlled to remote control the flight position of the aerial drone 9 and/or to remote control the camera 10, in particular with respect to the panning angle or the viewing axis of the camera 10 relative to the body of the aerial drone 9 and/or the focal length of the camera 10.

A corresponding remote control module can be provided in the crane operator's cab 6 and/or in the remote control station or in the mobile operating unit and can, for example, be equipped with corresponding joysticks. To enable a simple operation however, a voice control and/or a menu control can also be provided for the aerial drone 9, for example to select a desired relative position from a plurality of predefined relative positions of the aerial drone 9 relative to the crane. This can be done, for example, in that "drone position 1" is input by voice control and/or by menu control that can be stored in a preprogrammed or predetermined manner in the position control apparatus 13.

The position of the aerial drone 9 relative to the crane 1 and/or its loading hook can advantageously be controlled at least largely autonomously and independently of the crane, for example in a manner known per se via said joysticks of the remote control device 12. A desired position of the aerial drone 9 relative to the lifting hook 8 can be flown to via the autonomous control module of the position control apparatus 13.

Alternatively or additionally to such an autonomous position control module, the position control apparatus 13 can comprise an automatic follow control module to maintain a predefined position of the aerial drone 9—for example the designed position randomly flown to by the autonomous position control module and/or a predefined, preprogrammed position, even if the crane 1 carries out crane movements and/or the lifting hook 8 is moved so that the aerial drone 9 largely automatically follows the lifting hook 8 and maintains the predetermined relative position thereto.

A position determination apparatus 18 is advantageously provided that automatically determines the position of the aerial drone 9 relative to the cane 1 and/or its lifting hook 8 continuously or cyclically so that the position control apparatus 13 can control the aerial drone 9 in dependence on the determined relative position.

The aerial drone 9 can for this purpose, for example, comprise a GPS unit 14 by means of which the absolute spatial position of the aerial drone 9 is determined and is transmitted to the position control apparatus 13. On the other hand, the position of the lifting hook 8 can be determined so that the position control apparatus 13 can remote control the aerial drone 9 to maintain the relative position.

The lifting hook position can here generally likewise be determined by GPS, for example in that a GPS unit is integrated in the lifting hook. Alternatively or additionally, however, the lifting hook position can also be determined from the position of the crane components, in particular be calculated by the control apparatus 5 of the crane, for example in that the slewing angle of the boom, the position of the trolley 4 at the boom 3, and the uncoiling length of the hoist rope 7 are detected, from which, with a known installation location of the crane 1, the lifting hook position can be at least approximately determined if dynamic oscillating movements or wind effects are neglected.

Alternatively or additionally to such an absolute position determination, the position of the aerial drone 9 can also be determined relatively in a coordinate system fixed relative to the crane, i.e. rotating with the crane. For this purpose, transceivers, for example in the form of transponder units 15 that are advantageously attached to a plurality of mutually independent points of the crane 1 can be provided at the crane 1, for example at its boom 3 and at its tower 2, optionally also at its trolley 4 and/or at its lifting hook 8. Said transceivers 15 can communicate with a corresponding transceiver 16 at the aerial drone 9. For example, the distances of the aerial drone 9 from the respective transceivers 15 at the crane 1, and from these the position of the aerial drone 9 relative to the crane 1, can then be determined by a localization device 17 that can be integrated in the control device 5 of the crane 1, from the signal times of flight of a signal between the transceiver 16 at the aerial drone 9 and the respective transceivers 15 at the crane 1.

We claim:

1. A method of controlling a material transfer machine and/or a construction machine comprising a crane, comprising:

providing to a machine operator and/or to a machine control an image of a piece of working equipment and/or of an environment of the piece of working equipment, wherein the piece of working equipment comprises a lifting hook, wherein the image comprises a camera image and an infrared image detected by a remote control aerial drone comprising at least two imaging sensors, wherein the infrared image comprises one or more portions that represent one or more people, wherein the at least two imaging sensors comprise a camera for detecting the camera image and an infrared sensor for detecting the infrared image, wherein the method further comprises forming the image by superposing, via an image processing module, the camera image with only the one or more portions of the infrared image that represent the one or more people, wherein providing to the machine operator an image comprises displaying the image on a display unit for the machine operator, autonomously and automatically controlling the remote control aerial drone, wherein autonomously controlling the remote control aerial drone comprises inputting a desired position of the remote control aerial drone relative to the material transfer machine, the construction machine, and/or the piece of working equipment, switching from autonomously controlling the remote control aerial drone to automatically controlling the remote control aerial drone when the remote control aerial drone is in the desired position, and wherein automatically controlling the remote control aerial drone comprises a position control apparatus automatically maintaining the desired position such that the remote control aerial drone automatically follows movements of the material transfer machine, the construction machine, and/or the piece of working equipment to keep the desired position constant, and wherein automatically maintaining the desired position comprises the remote control aerial drone taking into account working zone limitations and model construction site data such that automatically maintaining the desired position is overridden if the remote control aerial drone reaches at least one of a working zone limitation of the working zone limitations and a building part from the model construction site data.

2. The method of claim 1, wherein a position of the remote control aerial drone relative to the material transfer machine, the construction machine, and/or the piece of working equipment is automatically determined continuously or cyclically by a position determination device, and wherein automatically maintaining the desired position is based on a signal of the position determination device.

3. The method of claim 1,
wherein autonomously controlling the remote control aerial drone comprises inputting different desired positions of the remote control aerial drone relative to the material transfer machine and/or the construction machine and/or the piece of working equipment, wherein the different desired positions comprise the desired position, and wherein the method further comprises switching from autonomously controlling the remote control aerial drone to automatically controlling the remote control aerial drone after the remote control aerial drone flies to the different desired positions.

4. The method of claim 1, further comprising:
controlling the at least two imaging sensors relative to a body of the remote control aerial drone and/or relative to a focal length of the at least two imaging sensors based on a material transfer machine position, a construction machine position, and/or a position of the piece of working equipment such that a viewing axis and/or a focus of the at least two imaging sensors automatically follows movements of the piece of working equipment during position changes of the remote control aerial drone relative to the material transfer machine and/or relative to the construction machine and/or relative to the piece of working equipment.

5. The method of claim 1, wherein the remote control aerial drone further comprises a control interface configured to receive control signals from work machines, wherein a flight control module of the remote control aerial drone is preconfigurable based on a pre-configuration data set read from a configuration library, wherein the pre-configuration data set read from the configuration library is based on a control signal from one of the work machines, and wherein a flying altitude of the remote control aerial drone and/or a focal length of an imaging sensor system is preconfigurable based on the pre-configuration data set read from the configuration library.

6. A material transfer machine and/or a construction machine comprising:
a crane comprising a movable piece of working equipment comprising a lifting hook;
a photonic mixing device sensor;
a position control apparatus; and
an imaging sensor for detecting an image of the movable piece of working equipment and/or of an environment of the moveable piece of working equipment, wherein the image comprises a camera image and an infrared image of the moveable piece of working equipment and/or of the environment of the moveable piece of working equipment;
wherein a remote control aerial drone comprises the imaging sensor, and wherein a machine control and/or a machine operator display unit comprise an image receiver for receiving the image from the imaging sensor;
wherein the imaging sensor comprises at least two different imaging sensors comprising a camera for detecting the camera image and an infrared sensor for detecting the infrared image, wherein the camera image and the infrared image are superposable by an image processing module to form a common image comprising the camera image and the infrared image, and wherein the common image is displayable on the machine operator display unit and/or transmittable to the machine control;
wherein the movable piece of working equipment and the environment of the moveable piece of working equipment are illuminatable with light pulses from the photonic mixing device sensor,
wherein a flight time of the light pulses is measurable by the photonic mixing device sensor,
wherein a distance to the movable piece of working equipment and a distance to the environment of the moveable piece of working equipment are determinable based on the flight time of the light pulses,
wherein the distance to the movable piece of working equipment and the distance to the environment of the moveable piece of working equipment are displayable as different colors of the movable piece of working equipment and the environment of the moveable piece of working equipment,
wherein the position control apparatus comprises an autonomous control module and an automatic follow control module,
wherein the remote control aerial drone is controllable via the autonomous control module and the automatic follow control module,
wherein a desired position of the remote control aerial drone relative to the material transfer machine, the construction machine, and/or the piece of working equipment is inputtable via the autonomous control module, and
wherein when the automatic follow control module is activated, the desired position is automatically maintained such that the remote control aerial drone automatically follows movements of the material transfer machine, the construction machine, and/or the piece of working equipment to keep the desired position constant, and wherein when the automatic follow control module is activated, the remote control aerial drone takes into account working zone limitations and model construction site data such that the automatic follow control module is overridden if the remote control aerial drone reaches at least one of a working zone limitation of the working zone limitations and a building part from the model construction site data.

7. The material transfer machine and/or the construction machine of claim 6, wherein different desired positions relative to the material transfer machine and/or the construction machine and/or the moveable piece of working equipment are inputtable via the autonomous control module, wherein the different desired positions comprise the desired position, and wherein control of the remote control aerial drone is switchable from the autonomous control module to the automatic follow control module when the remote control aerial drone is in the desired position.

8. The material transfer machine and/or the construction machine of claim 6, wherein the position control apparatus has a voice recognition device for inputting control commands by voice and/or has a gesture recognition device comprising a camera having a downstream image evaluation device for inputting control commands by gestures.

9. The material transfer machine and/or the construction machine of claim 6, further comprising a position determination device, wherein the desired position is automatically determinable via the position determination device, and wherein the remote control aerial drone is controllable based on the desired position of the remote control aerial drone automatically determined by the position determination device.

10. The material transfer machine and/or the construction machine of claim 9, wherein the remote control aerial drone has a GPS unit for an absolute position determination of the remote control aerial drone, and wherein the remote control aerial drone is controllable via the position control apparatus based on absolute position data of the remote control aerial drone and on absolute position data of the material transfer machine and/or the construction machine and/or the moveable piece of working equipment.

11. The material transfer machine and/or the construction machine of claim 10, wherein the position determination device comprises a signal location apparatus for locating a signal output by the remote control aerial drone, wherein the signal location apparatus comprises:
 transceivers attached to the material transfer machine and/or the construction machine and spaced apart from one another for communicating with a transceiver on the remote control aerial drone, and
 an evaluation device for evaluating transmitted signals between the transceivers attached to the material transfer machine and/or the construction machine and the transceiver on the remote control aerial drone with respect to predetermined signal properties comprising a signal time of flight and/or a signal strength of the transmitted signals, and for determining a position of the remote control aerial drone from the signal properties.

12. The material transfer machine and/or the construction machine of claim 6, wherein the imaging sensor further comprises a radar sensor and/or a time of flight sensor.

13. The material transfer machine and/or the construction machine of claim 6, wherein a 3D image is providable by the imaging sensor; and/or wherein a 3D image is displayable on the machine operator display unit.

14. The material transfer machine and/or the construction machine of claim 6, wherein the remote control aerial drone further comprises a control interface configured to receive control signals from work machines, wherein a flight control module of the remote control aerial drone is preconfigurable based on a pre-configuration data set read from a configuration library, wherein the pre-configuration data set read from the configuration library is based on a control signal from one of the work machines, and wherein a flying altitude of the remote control aerial drone and/or a focal length of an imaging sensor system is preconfigurable based on the pre-configuration data set read from the configuration library.

15. A system for controlling a material transfer machine and/or a construction machine comprising:
 a tower crane comprising a tower, a boom, a trolley, a hoist rope, and a lifting hook, wherein the tower supports the boom, wherein the trolley is travelable along the boom, and wherein the hoist rope runs down from the trolley and is connected to the lifting hook;
 an aerial drone comprising a first imaging sensor and a second sensor;
 a position determination apparatus comprising transceivers attached to the tower, the boom, the trolley, and the lifting hook, wherein a position of the aerial drone relative to the material transfer machine and/or the construction machine and/or the lifting hook and/or a piece of working equipment is automatically determinable via the position determination apparatus from signal flight times and/or signal strengths between the transceivers and a transceiver on the aerial drone, wherein movements of the material transfer machine and/or the construction machine and/or the lifting hook and/or the piece of working equipment are automatically followable by the aerial drone based on the position of the aerial drone relative to the material transfer machine and/or the construction machine and/or the lifting hook and/or the piece of working equipment determined by the position determination apparatus, and wherein a viewing axis and a focal length of the first imaging sensor and/or the second imaging sensor relative to a body of the aerial drone are automatically adjustable based on the position of the aerial drone relative to the material transfer machine and/or the construction machine and/or the lifting hook and/or the piece of working equipment determined by the position determination apparatus such that the movements of the material transfer machine and/or the construction machine and/or the lifting hook and/or the piece of working equipment are automatically followable by the aerial drone;
 a remote control device for remote control of the aerial drone; and
 a crane operator display unit for displaying an image comprising a first image superposed with a second image to a crane operator station and/or to a remote control station and/or to a mobile operating unit for controlling the tower crane,
 wherein the remote control device comprises a position control apparatus having an autonomous control module and an automatic follow control module,
 wherein the aerial drone is controllable via the autonomous control module and the automatic follow control module,
 wherein a desired position of the aerial drone relative to the material transfer machine, the construction machine, the lifting hook and/or the piece of working equipment is inputtable via the autonomous control module, and
 wherein when the automatic follow control module is activated, the desired position is automatically maintained such that the aerial drone automatically follows movements of the material transfer machine, the construction machine, the lifting hook and/or the piece of working equipment to keep the desired position constant and wherein when the automatic follow control module is activated, the aerial drone takes into account working zone limitations and model construction site data such that the automatic follow control module is overridden if the aerial drone reaches at least one of a working zone limitation of the working zone limitations and a building part from the model construction site data.

16. The system of claim 15, wherein different desired positions of the aerial drone relative to the material transfer machine and/or the construction machine and/or the lifting hook and/or the piece of working equipment are inputtable via the autonomous control module, wherein the different desired positions comprise the desired position, and wherein control of the aerial drone is switchable from the autonomous control module to the automatic follow control module when the aerial drone is in the desired position.

17. The system of claim 15, wherein the first imaging sensor comprises a camera and the second imaging sensor comprises an infrared sensor.

18. The system of claim 15, wherein the first image is a camera image and the second image is an infrared image.

19. The system of claim 15, wherein the first imaging sensor comprises a camera and the second imaging sensor comprises an infrared sensor, and wherein the first image is a camera image and the second image is an infrared image.

20. The system of claim 15, wherein the aerial drone further comprises a control interface configured to receive control signals from work machines, wherein a flight control module of the aerial drone is preconfigurable based on a pre-configuration data set read from a configuration library, wherein the pre-configuration data set read from the configuration library is based on a control signal from one of the work machines, and wherein a flying altitude of the aerial drone and/or the focal length of the first imaging sensor and/or the second imaging sensor is preconfigurable based on the pre-configuration data set read from the configuration library.

* * * * *